J. M. McCUE.
Artificial Ford or Dam.
No. 203,174. Patented April 30, 1878.
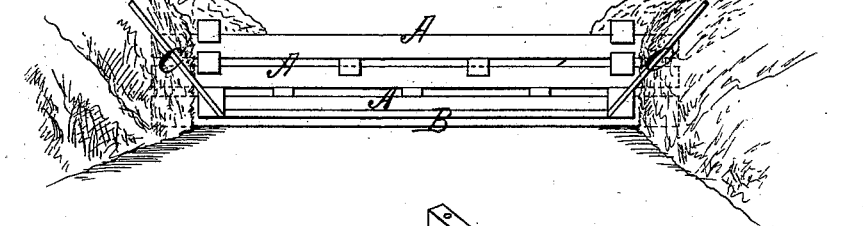
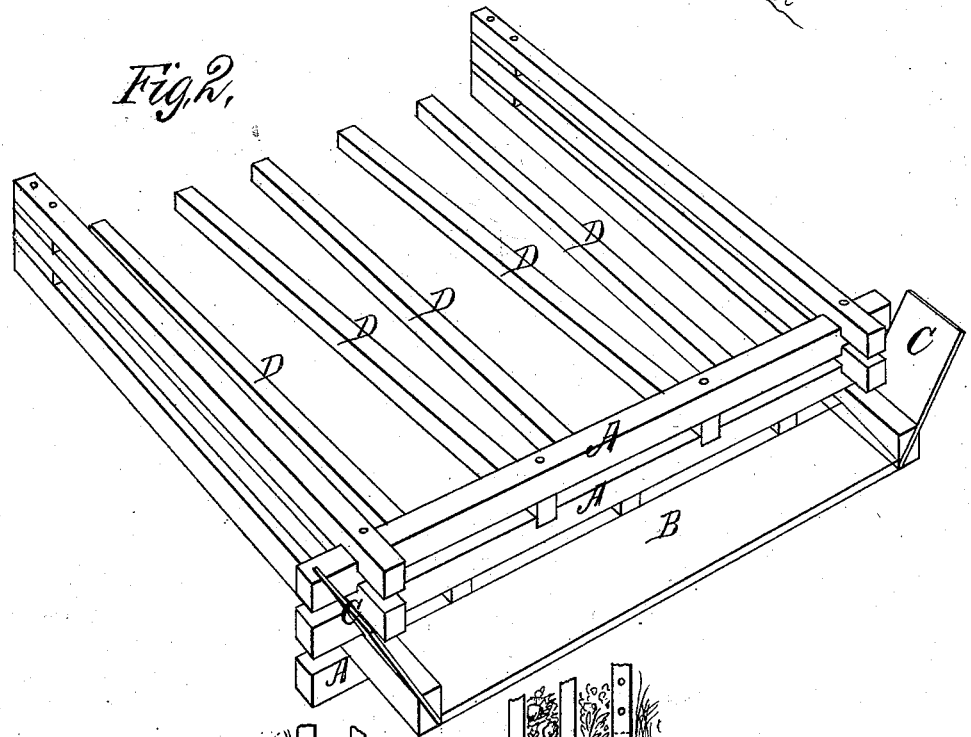
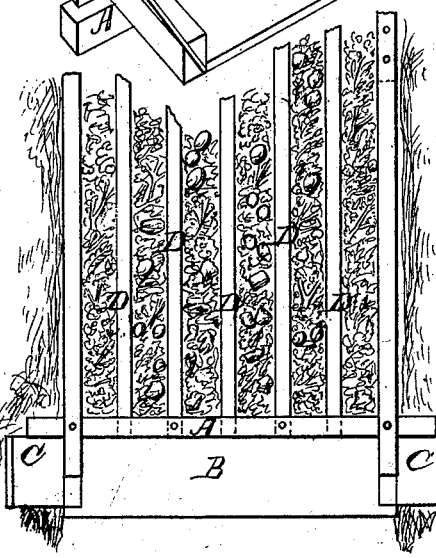
WITNESSES
Villette Anderson
F. J. Masi
INVENTOR
J. Marshall McCue
by E.W. Anderson
ATTORNEY

UNITED STATES PATENT OFFICE.

JOHN MARSHALL McCUE, OF MOUNT SOLON, VIRGINIA.

IMPROVEMENT IN ARTIFICIAL FORDS OR DAMS.

Specification forming part of Letters Patent No. 203,174, dated April 30, 1878; application filed December 22, 1877.

*To all whom it may concern:*

Be it known that I, J. MARSHALL McCUE, of Mount Solon, in the county of Augusta and State of Virginia, have invented a new and valuable Improvement in Artificial Causeways, Fords, &c.; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my improvement, looking up stream. Fig. 2 is a perspective view thereof, and Fig. 3 is a top view of the same applied.

This invention has for its object to devise a cheap and effective means for bridging small streams, filling up gullies, ravines, or washes, and other analogous purposes.

The nature of the invention consists in two or more logs or trees extending across the stream, and arranged the one on top of the others, having a number of logs or trees, suitably spaced, secured at one end to the transverse logs, and extending up stream, and a horizontal apron on the down-stream side of the said logs, whereby a barrier to the passage down stream of the silt and detritus is formed, which, by accumulation, will form a reliable and cheap ford or causeway, as will be hereinafter more fully set forth.

In the annexed drawings, the letter A designates a number of logs or small trees, extending at any desired angle across the stream, and laid the one upon the other. These may be spaced so as to leave an interval between them, or they may be laid the one directly in contact with the others. Their ends will also extend into the bank where it is practicable, so as to anchor the same firmly in position.

On the down-stream side of the barricade thus formed, and extending under the same a certain distance up stream beyond it, is an apron, B, which extends from bank to bank. This apron may be formed of boards, anchored in position by the timbers of the barricade, or of brush thickly laid upon the bottom. At each end of this apron, at the down-stream side of the barricade, is arranged a guard, C, in a preferably inclined position, which, like the apron, may be made of boards, or of weighted or anchored masses of brush-wood.

D represents logs or trees, the butt-ends of which are secured to the barricade above described, and extend up stream in a downwardly-inclined position, with their free ends resting upon the bottom. There will be one or more tiers of these logs or trees, according to the depth of the stream and the height of the said barricade.

When logs are used, a quantity of brush-wood will be thrown between them, and secured thereto, or anchored to the bottom in any suitable manner, but preferably with stones.

Should trees be used, the horizontal branches will be half cut through and bent up stream, stones being used, as before.

In practice the barricade extends from the bottom up to, or nearly up to, low-water mark.

It is clear that silt, sand, and other floating or suspended substances will be arrested and precipitated by the brush on the up-stream side of the barricade, while the water will pass through, thus forming in a short time a solid accumulation of the above materials up to, or nearly up to, the water-level, over which a thin sheet of water will continually pour, thus preventing the damming of the water above it.

The apron prevents the back-wash from undermining the barricade upon its down-stream side by receiving the water as it passes over the dam, or, as it should be called, the "artificial ford," and the lateral guard at each end of the said apron protects the bank from all wash.

The apron, when made of boards, should be secured to sills of any durable timber buried in the bottom of the stream, or secured in any suitable manner to the timber of the barricade, extended or anchored into the side banks for this purpose.

When the stream is wide, two or more logs or trees may be secured end to end until the barricade reaches the other bank.

When the stream is unusually rapid, the barricade may be supported at its down-stream side by means of piles, stakes, or other equivalent devices.

Having thus described my invention, what I claim as new, and desire to secure by Letters Patent, is—

1. The barricade having trees or timber secured thereto upon its up-stream side, and filled in with brush-wood and stones, in combination with an apron upon the down-stream side of the barricade, to prevent the undermining thereof, and lateral guards at the ends of the said apron, for the protection of the banks, the apron and guards having suitable anchoring devices, all substantially as described, for the purpose of damming streams and filling ravines and gullies, as set forth.

2. The combination, with a transverse barricade, A, having the logs or trees extending up stream, of the apron B and lateral guards C, substantially as specified.

In testimony that I claim the above I have hereunto subscribed my name in the presence of two witnesses.

JOHN MARSHALL McCUE.

Witnesses:
Mrs. J. M. KINNEY,
C. C. FURRY.